United States Patent
Tokuyama

(10) Patent No.: US 10,452,823 B2
(45) Date of Patent: Oct. 22, 2019

(54) TERMINAL DEVICE AND COMPUTER PROGRAM

(71) Applicant: Masaaki Tokuyama, Tokyo (JP)

(72) Inventor: Masaaki Tokuyama, Tokyo (JP)

(73) Assignee: Masaaki Tokuyama, Tokyo (JP)

( * ) Notice: Subject to any disclaimer, the term of this patent is extended or adjusted under 35 U.S.C. 154(b) by 119 days.

(21) Appl. No.: 15/570,168

(22) PCT Filed: May 2, 2016

(86) PCT No.: PCT/JP2016/063613
§ 371 (c)(1),
(2) Date: Oct. 27, 2017

(87) PCT Pub. No.: WO2016/175333
PCT Pub. Date: Nov. 3, 2016

(65) Prior Publication Data
US 2018/0137265 A1 May 17, 2018

(30) Foreign Application Priority Data

Apr. 30, 2015 (JP) .................................. 2015-093730
Apr. 30, 2015 (JP) .................................. 2015-093731

(51) Int. Cl.
*G06F 21/32* (2013.01)
*H04M 1/67* (2006.01)
*H04M 1/673* (2006.01)

(52) U.S. Cl.
CPC .............. *G06F 21/32* (2013.01); *H04M 1/67* (2013.01); *H04M 1/673* (2013.01); *H04M 2250/12* (2013.01); *H04M 2250/22* (2013.01)

(58) Field of Classification Search
CPC ......... G06F 21/32; H04M 1/67; H04M 1/763; H04M 2250/22; H04M 2250/12
(Continued)

(56) References Cited

U.S. PATENT DOCUMENTS

| | | | |
|---|---|---|---|
| 2008/0148375 A1* | 6/2008 | Yamamoto | G06F 21/31 726/7 |
| 2008/0189762 A1* | 8/2008 | Toriumi | G06F 21/32 726/2 |

(Continued)

FOREIGN PATENT DOCUMENTS

| | | |
|---|---|---|
| CN | 102664928 A | 9/2012 |
| JP | 2000-059355 A | 2/2000 |

(Continued)

OTHER PUBLICATIONS

English-language translation of Notification of Reasons for Rejection dated Oct. 18, 2016 in related Japanese Appl. 2016-555620 (4 pgs.).

(Continued)

*Primary Examiner* — Jeffrey C Pwu
*Assistant Examiner* — Nega Woldemariam
(74) *Attorney, Agent, or Firm* — Foley & Lardner LLP

(57) ABSTRACT

A terminal device (10) comprises a group of sensors (11, 14 to 17) acquiring multiple different pieces of authentication information such as a password, fingerprint information, voiceprint information, and a face image. For each piece of the acquired authentication information, a controller (110) executes a separate authentication procedure based on each piece of authentication information on the basis of a reference level at which the authentication cannot be determined to be successful in authentication by a single piece of authentication information, determines whether the authentication is successful or failed from a combination of results of multiple separate authentication procedures, and unlock the device when determined that the authentication is successful.

9 Claims, 8 Drawing Sheets

(58) Field of Classification Search
USPC .......................................................... 726/18
See application file for complete search history.

(56) References Cited

U.S. PATENT DOCUMENTS

| | | | | |
|---|---|---|---|---|
| 2013/0263282 | A1* | 10/2013 | Yamada | G06F 21/32 |
| | | | | 726/28 |
| 2013/0272586 | A1* | 10/2013 | Russo | G06K 9/00087 |
| | | | | 382/124 |
| 2014/0173715 | A1* | 6/2014 | Yano | G06F 21/31 |
| | | | | 726/16 |
| 2014/0302818 | A1* | 10/2014 | Fyke | G06F 21/32 |
| | | | | 455/411 |
| 2015/0043792 | A1* | 2/2015 | Nada | G06K 9/00006 |
| | | | | 382/126 |
| 2015/0154392 | A1* | 6/2015 | Bao | G06F 21/32 |
| | | | | 726/19 |
| 2016/0063235 | A1* | 3/2016 | Tussy | G06F 21/32 |
| | | | | 726/6 |
| 2017/0142102 | A1* | 5/2017 | Toyoshima | G06F 12/1408 |
| 2017/0180362 | A1* | 6/2017 | Du | G06F 21/32 |
| 2018/0181737 | A1* | 6/2018 | Tussy | G06K 9/00288 |

FOREIGN PATENT DOCUMENTS

| | | |
|---|---|---|
| JP | 2005-078228 A | 3/2005 |
| JP | 2005-100063 A | 4/2005 |
| JP | 2005-123883 A | 5/2005 |
| JP | 2005-146709 A | 6/2005 |
| JP | 2006-011591 A | 1/2006 |
| JP | 2007-004796 A | 1/2007 |
| JP | 2007-206934 A | 8/2007 |
| JP | 2007-281919 A | 10/2007 |
| JP | 2009-134482 A | 6/2009 |
| JP | 2010-198536 A | 9/2010 |
| JP | 2013-120600 A | 6/2013 |
| JP | 2014-085913 A | 5/2014 |
| JP | 2015-001800 A | 1/2015 |

OTHER PUBLICATIONS

International Search Report dated Jul. 19, 2016 in PCT/JP2016/063614 with English-language translation (4 pgs.).
International Search Report dated Jun. 14, 2016 in PCT/JP2016/063613 with English-language translation (4 pgs.).
Non-final Office Action issued in U.S. Appl. No. 15/570,035 dated May 16, 2019 (including U.S. Pat. No. 6,061,733-A, 8,769,270-B2; U.S. Publication No. 2003/0174867-A1, 2008/0065901-A1, 2009/0300737-A1, 2015/0172286-A1, 2016/0294555-A1; and Japanese Publication No. 2006-085249-A (with English machine translation) as mentioned therein).

* cited by examiner

FIG. 4

AUTHENTICATION DB 111B

| INFORMATION TYPE | | REGISTERED INFORMATION | ACCEPTANCE CONDITION | REJECTION CONDITION | POINTS |
|---|---|---|---|---|---|
| PASSWORD | | 2345 | COMPLETE MATCH | UNMATCHED | 2.2 |
| PERSONAL INFORMATION | DATE OF BIRTH | FEBRUARY 29 | COMPLETE MATCH | UNMATCHED | 2 |
| | HEIGHT | 175 | | | |
| | HOME TOWN | OSAKA | | | |
| | .... | .... | .... | .... | .... |
| VOICEPRINT INFORMATION | | ‖‖‖‖‖‖‖‖ | 65 % OR HIGHER LIKELIHOOD | LESS THAN 40 % | 1.3 |
| | | .... | .... | .... | .... |
| LEFT FINGERPRINT INFORMATION | | ◎◎◎◎ | 65 % OR HIGHER LIKELIHOOD | LESS THAN 40 % | 1 |
| RIGHT FINGERPRINT INFORMATION | | ◎▽◎△ | 65 % OR HIGHER LIKELIHOOD | LESS THAN 35 % | 1 |
| | | ◇▽◎□ | 65 % OR HIGHER LIKELIHOOD | LESS THAN 35 % | 1 |
| FACE IMAGE | | ABAB | 65 % OR HIGHER LIKELIHOOD | LESS THAN 35 % | 1.4 |
| | | CDE | | | |
| | | .... | .... | .... | .... |
| GPS | | (x1,y1) | 80 % OR HIGHER LIKELIHOOD | NONE | 0.7 |
| | | (x2,y2) | 80 % OR HIGHER LIKELIHOOD | NONE | 0.4 |
| | | .... | .... | .... | .... |

| 0 | 1 | 2 |
|---|---|---|
| 3 | 4 | 5 |
| 6 | 7 | 8 |
| 9 | 0 | RETURN |

FIG. 8A

BIOMETRIC AUTHENTICATION FLAG "0"

| INFORMATION TYPE | REGISTERED INFORMATION |
|---|---|
| PASSWORD | 000000 |
| LEFT FINGERPRINT INFORMATION | |
| RIGHT FINGERPRINT INFORMATION | |
| FACE IMAGE | |

FIG. 8B

BIOMETRIC AUTHENTICATION FLAG "1"

| INFORMATION TYPE | REGISTERED INFORMATION |
|---|---|
| PASSWORD | 234567 |
| LEFT FINGERPRINT INFORMATION | ◎◎◎◎ |
| | CDE |
| | •••• |
| RIGHT FINGERPRINT INFORMATION | ◎▽◎△ |
| | ◇▽◎□ |
| | •••• |
| FACE IMAGE | ABAB |
| | CDE |
| | •••• |

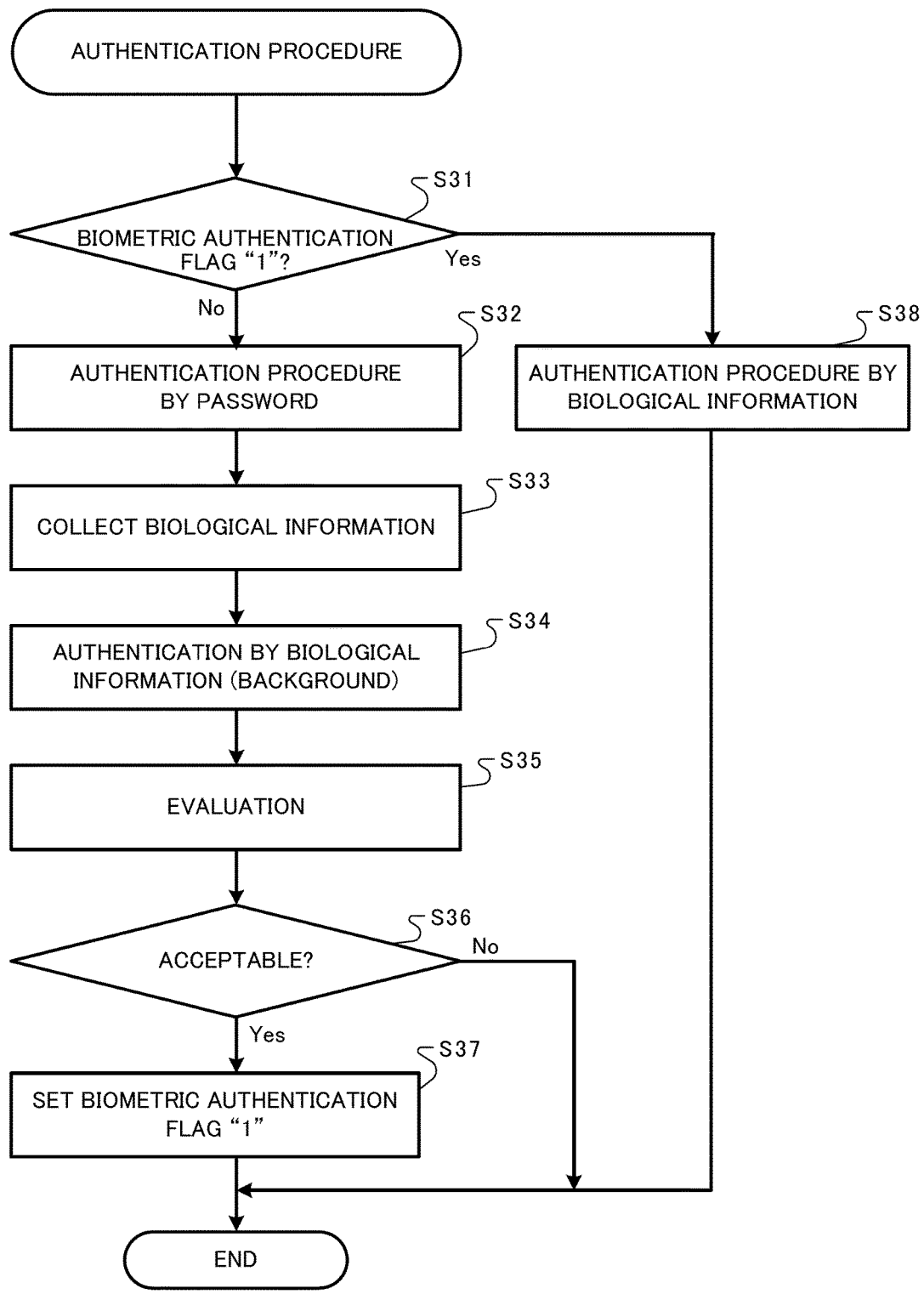

TERMINAL DEVICE AND COMPUTER PROGRAM

TECHNICAL FIELD

The present disclosure relates to a terminal device comprising the function of authentication and a computer program.

BACKGROUND ART

For preventing unauthorized use, convention terminal devices comprise the function of authentication and allow use of major functions when authentication is successful. Passwords generally used in the authentication process have problems such as troublesome to enter, easily leaking, and vulnerable in terms of security. Recently, authentication using biological information other than passwords, such as fingerprints and voiceprints, is utilized (for example, see Patent Literature 1).

CITATION LIST

Patent Literature

Patent Literature 1: Unexamined Japanese Patent Application Kokai Publication No. 2009-134482.

SUMMARY OF INVENTION

Technical Problem

Among the prior art authentication processes, password authentication requires a troublesome work of entering a password from a keyboard. On the other hand, fingerprint authentication often results in false recognition and rejects the fingerprints of an authorized user in many cases. As just stated, a problem is that the prior art authentication methods impose a significant load on the user.

Moreover, in the prior art authentication function, a high level of accuracy is set for accurate authentication and this causes the price of a device to rise. On the other hand, if the recognition level is lowered, the security is not maintained. Moreover, biometric authentication requires tiresome registration operation.

The present disclosure is made with the view of the above situation and an objective of the disclosure is to provide a terminal device comprising the function of authentication requiring less user operation load and configured at low cost.

Moreover, another objective of the disclosure is to provide a terminal device comprising the function of authentication requiring less user operation load and capable of maintaining high security.

Moreover, a further other objective of the disclosure is to provide highly reliable biometric authentication function requiring less user operation load.

Solution to Problem

In order to solve the above problem, the terminal device according to the present disclosure comprises:

an authentication information acquirer acquiring multiple different pieces of authentication information;

a separate authentication procedure executor executing a separate authentication procedure based on each piece of authentication information acquired by the authentication information acquirer;

a total authentication determiner determining whether authentication is successful or failed from a combination of results of multiple separate authentication procedures performed by the separate authentication procedure executor; and an unlocker for unlocking a device to allow operations when the total authentication determiner determines that the authentication is successful.

For example, for each of the multiple pieces of authentication information acquired by the authentication information acquirer, the separate authentication procedure executor executes a separate authentication procedure based on each piece of authentication information on the basis of a reference level at which the authentication cannot be determined to be successful in authentication by a single piece of authentication information, and the total authentication determiner determines whether the authentication is successful or failed from a combination of results of multiple separate authentication procedures performed by the separate authentication procedure executor.

For example, the authentication information includes:

information based on which the separate authentication is determined to be successful only when the information completely matches preregistered information; and information based on which the separate authentication is determined to be successful when a degree of match between the information and registered information is equal to or higher than a reference level.

For example, points scored when the authentication is determined to be successful in the separate authentication procedure is set for each piece of authentication information, and the total authentication determiner adds up the points scored in the separate authentication procedures and determines that the authentication is successful when total points are equal to or higher than a reference value.

For example, for some of the authentication information, a criterion for regarding the authentication unsuccessful regardless of the total points when the criterion is satisfied is set.

Moreover, for example, the authentication information acquirer acquires a password as a piece of authentication information, the separate authentication procedure executor executes the password authentication procedure, furthermore, the terminal device according to the present disclosure comprises a biological information acquirer acquiring biological information and a biological information accumulator accumulating the biological information acquired by the biological information acquirer, and the separate authentication procedure executor comprises:

a biological information authenticator executing an authentication procedure based on the biological information acquired by the biological information acquirer; and a switching controller evaluating authentication results obtained in the authentication procedure by the biological information authenticator and switching from the password authentication by the separate authentication procedure executor to authentication by the biological information authenticator when the authentication by the biological information authenticator is determined to satisfy a predetermined criterion.

For example, the switching controller switches from the password authentication by the separate authentication procedure executor to the authentication by the biological information authenticator when a predetermined or more amount of biological information is accumulated in the biological information accumulator and the authentication procedure by the biological information authenticator is successively successful a reference or higher number of times.

A computer program for making a computer function as the above-described terminal device is also included in the present disclosure.

Advantageous Effects of Invention

According to the present disclosure, the separate authentication itself does not need to be of high accuracy, whereby the input is easy and the process is simplified. Consequently, a terminal device comprising the function of authentication requiring less user operation load and configured at low cost can be provided.

Moreover, according to the present disclosure, biological information is accumulated without knowing and password authentication is switched to biometric authentication.

BRIEF DESCRIPTION OF DRAWINGS

FIG. 4 is a chart for explaining the authentication DB saved in the storage shown in FIG. 2;

FIG. 8A is a chart for explaining authentication data in the initial state that are saved in the storage of the terminal device according to Embodiment 2;

FIG. 8B is a chart for explaining authentication data after processed to some extent that are saved in the storage of the terminal device according to Embodiment 2; and FIG. 9 is a flowchart of the authentication procedure of the terminal device according to Embodiment 2.

DESCRIPTION OF EMBODIMENTS

Embodiment 1

The terminal device according to Embodiment 1 of the present disclosure will be described below with reference to the drawings.

A terminal device 10 of this embodiment is a so-called smartphone and comprises the function of authentication by fingerprints or voiceprints.

Figure 1:
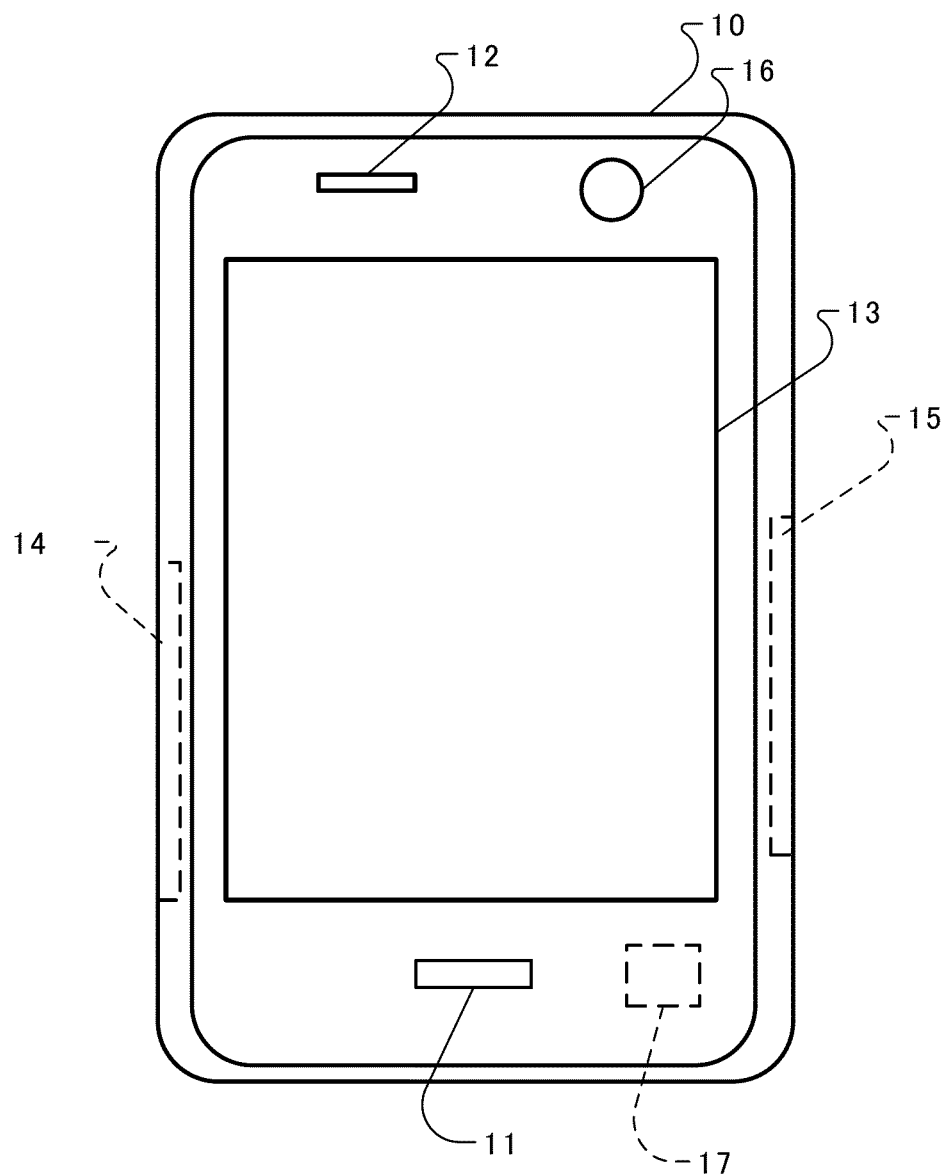
FIG. 1 is a front view of the terminal device according to Embodiment 1 of the present disclosure.

The terminal device 10 comprises, as shown in FIG. 1, a microphone 11 and a speaker 12 for conversation, a touch panel 13 for display and input, a left fingerprint sensor 14, a right fingerprint sensor 15, a camera 16, and a GPS device 17 on the device front.

Figure 2:
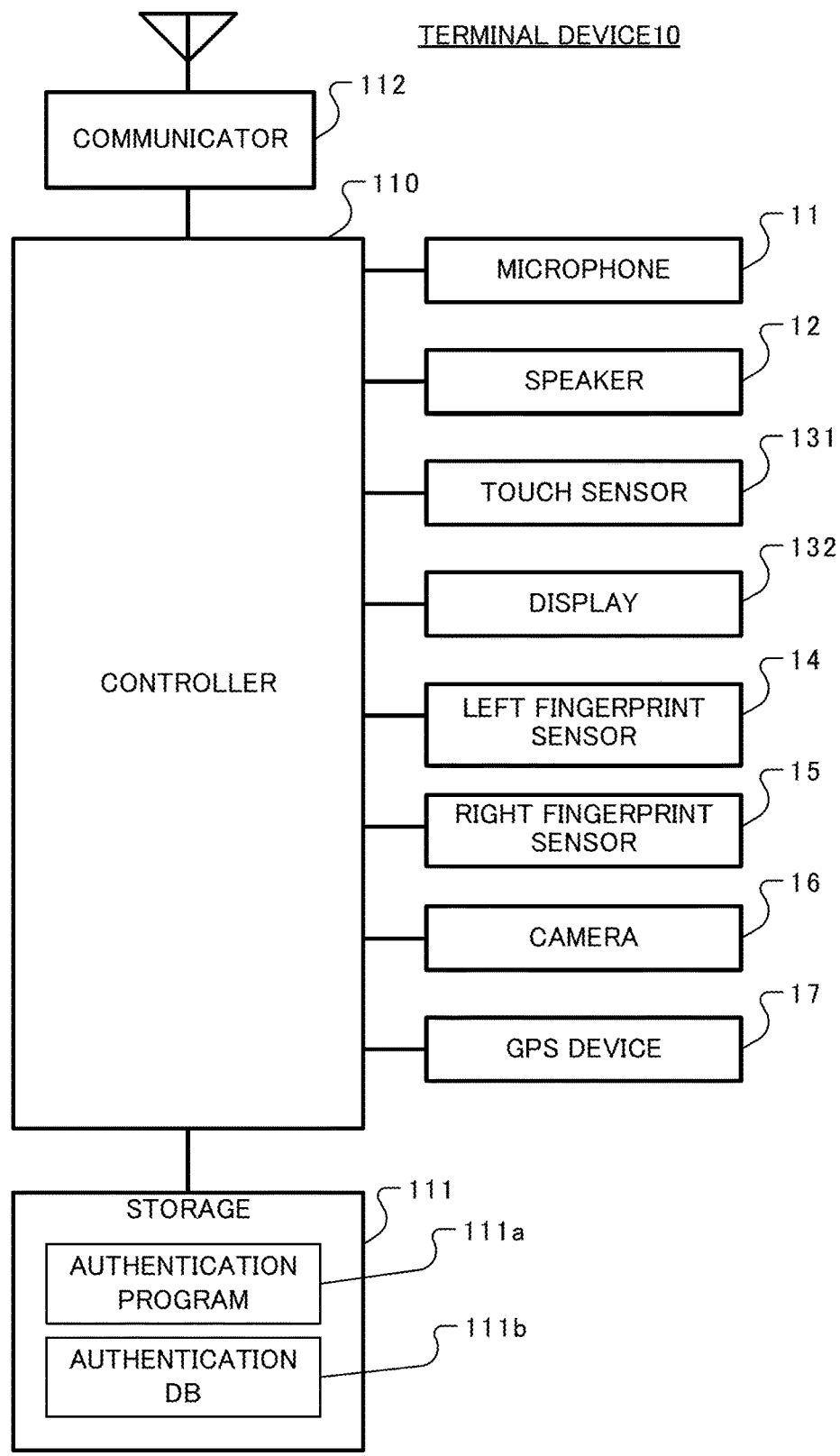
FIG. 2 is a block diagram of the terminal device shown in FIG. 1.

FIG. 2 shows a block configuration of the terminal device 10. As shown in the figure, the terminal device 10 comprises a controller 110, and the microphone 11, the speaker 12, a touch sensor 131, a display 132, the left fingerprint sensor 14, the right fingerprint sensor 15, the camera 16, the GPS device 17, a storage 111, and a communicator 112, which are connected to the controller 110.

The microphone 11 is a device to pick up voice of the user during voice conversation. The speaker 12 outputs received voice during voice conversation. The touch sensor 131 and the display 132 are layered to constitute the touch panel 13 shown in FIG. 1. The touch sensor 131 determines the position of a user operation. The display 132 displays various kinds of information according to the control of the controller 110.

Figure 3:
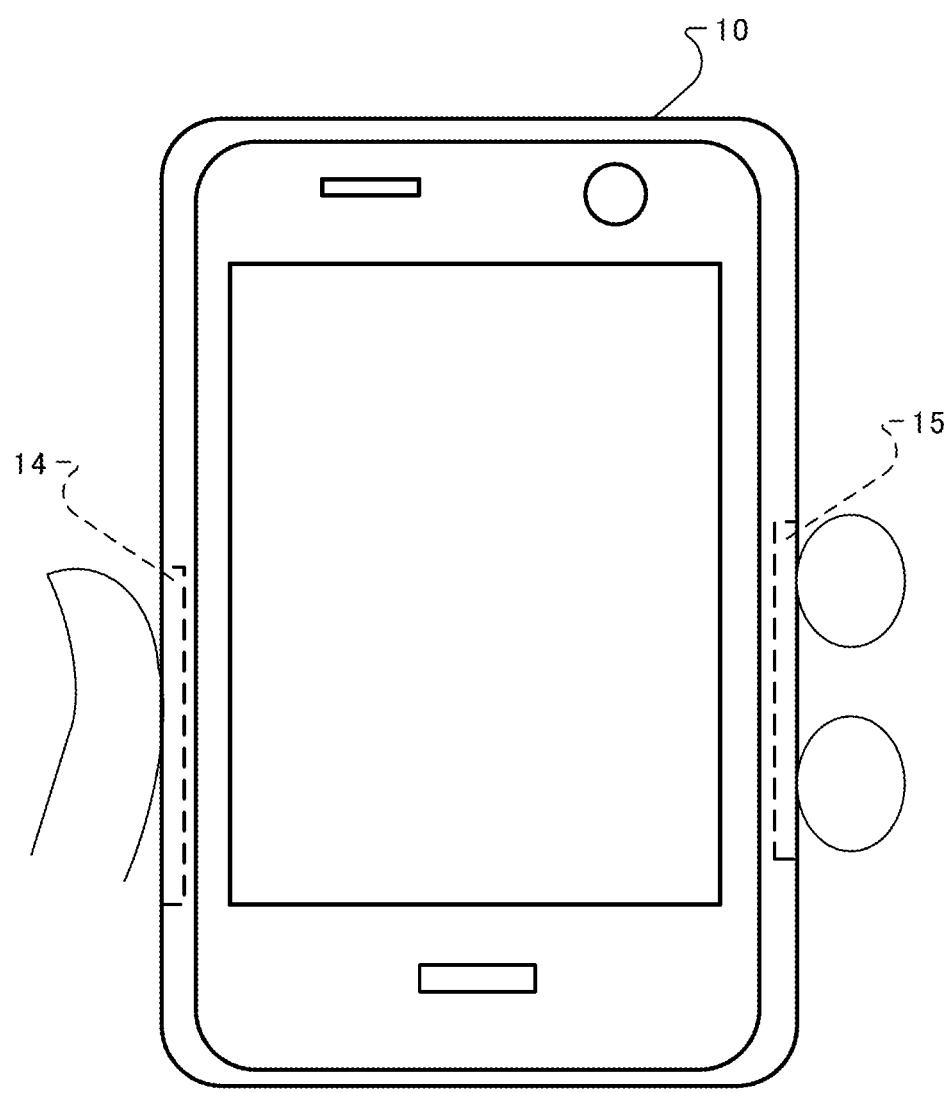
FIG. 3 is an illustration showing the terminal device shown in FIG. 1 when held in one's hand.

The left fingerprint sensor 14 and the right fingerprint sensor 15 each detect fingerprints of the user. As shown in FIG. 3, when the user holds the terminal device 10 in his left hand, the left fingerprint sensor 14 is placed at the position where the thumb makes contact, namely on the left side of the terminal device 10, and detects the fingerprint of the thumb. When the user holds the terminal device 10 in his left hand, the right fingerprint sensor 15 is placed at the position where the middle finger and ring finger make contact, namely on the right side of the terminal device 10, and detects the fingerprints of the middle finger and ring finger.

The camera 16 is disposed on the front of the terminal device 10 and captures an image of an object. The GPS device 17 is disposed within the terminal device 10 and detects the current location of the terminal device 10.

The controller 110 comprises a processor, a random access memory (RAM), and the like, and executes application programs stored in the storage 111. The application programs include an authentication program 111a, an email program, a schedule management program, and the like. The controller 110 executes the authentication program 111a to perform the authentication procedure at times of startup, wakeup from sleep, access to a specific file requiring authentication, and the like, and if the authentication is successful, unlocks and allows the processing from then on. Moreover, the controller 110 executes the email program to create/edit an email message and transmit/receive an email message. Moreover, the controller 110 executes the schedule management program to extract schedule information included in a created or received email message and post it on the calendar and/or give advance notice.

The storage 111 is a nonvolatile memory used as an auxiliary storage device. The storage 111 saves an operating system (OS) and application programs including the above-described authentication program 111a, email program, and schedule management program, and the like. Moreover, the storage 111 saves email messages, schedule data, and the like.

The storage 111 further saves an authentication DB 111b. As shown in FIG. 4, the authentication DB 111b associates and stores an information type, registered information, an acceptance condition, a rejection condition, and points.

The information type presents the type of information used in authentication. The registered information is information preregistered in regard to the type. The acceptance condition is a condition presenting at what degree of match between the entered information and the registered information, the authentication is determined to be successful in regard to that information type. The rejection condition presents a condition for determining that the authentication is unsuccessful when the degree of match between the entered information and the registered information falls under the criterion thereof. The points are points scored to the item when the authentication is determined to be successful.

Figures 6, 7:
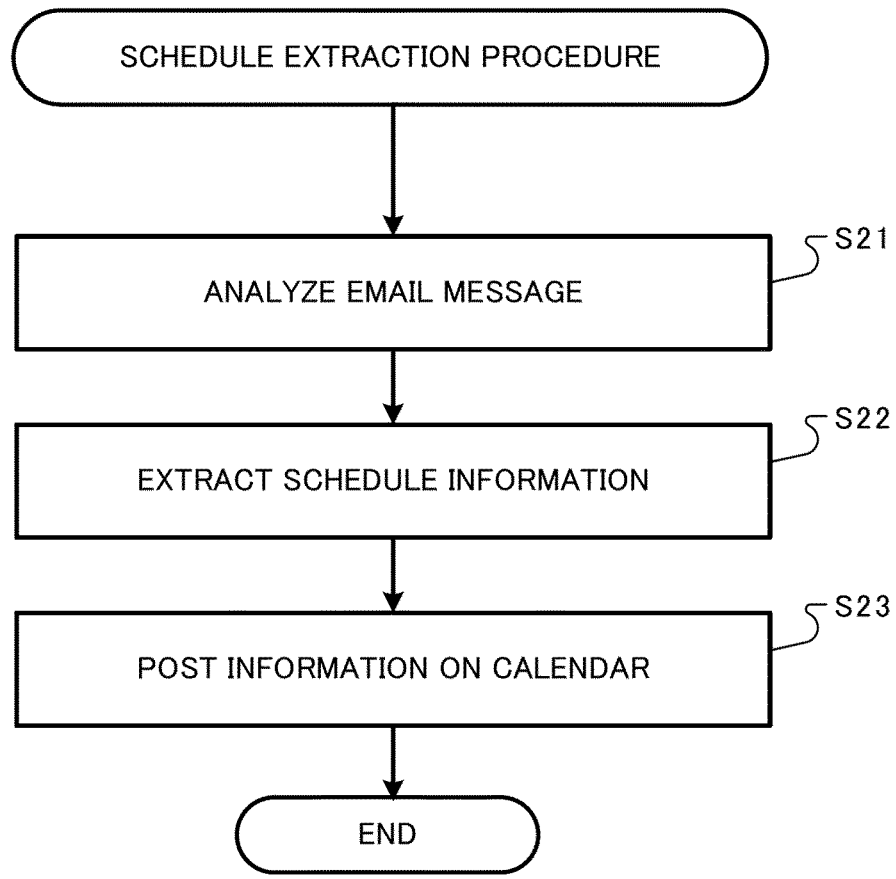
FIG. 6 is an illustration showing an example of the keyboard displayed on the touch panel.
FIG. 7 is a flowchart of the schedule extraction procedure.

In this embodiment, a password, personal information, voiceprint information, fingerprint information, a face image, and location information are used as the information type. The password is a character string. Here, a character string that is easy to enter on the terminal device 10 of a relatively small screen size is set as a password. In other words, if a lot of information can be entered from the touch panel 13 on the terminal device 10 of a small screen size, processing like switching the software keyboard and operating a single button many times to enter a character is necessary. However, such operation is troublesome. Then, a mode that does not require switching the display of the software keyboard and allows input of a character forming a password with a single button operation is used. For example, as shown in FIG. 6, if the software keyboard displayed on the touch panel 13 has a key array of three rows and four columns, a string of characters and numbers selected from among 12 (or less) keys is set as a password.

The personal information is desirably information only the legitimate user knows and, for example, preregistered by the user himself.

The voiceprint information is, for example, acquired through the microphone 11 and preregistered by the user himself.

The fingerprint information is, for example, preregistered by the user himself. Here, during the authentication procedure, a right-handed user holds the terminal device 10 as shown in FIG. 3. Therefore, information of the thumb is registered as left fingerprint information and information of the middle finger and ring finger is registered as right fingerprint information. For the left-handed, the information types are reversed. Moreover, the user holding the device in a specific way registers information according to his way of holding.

The face image is, for example, acquired by the camera 16 and preregistered by the user himself. Here, it is desirable to register several images taken in different directions.

When the voiceprint information, the fingerprint information, the face image, and the like are used in authentication by itself, generally, a degree of match of 95% or higher is required as a criterion for determining that the authentication is successful. In this embodiment, a criterion is set so that the separate authentication is determined to be successful at a lower degree of match of 65% or 70%.

As for the location information, a location where the legitimate user of the terminal device 10 is present for a long period of time such as the location of his own house (latitude and longitude) or the location of his working place or his school. For this, for example, the current location may be registered while the user is at home or at school.

The communicator 112 performs wireless communication with a base station or a nearby access point according to the control of the controller 110 for voice conversation, email communication, data communication, and the like.

Figure 5:
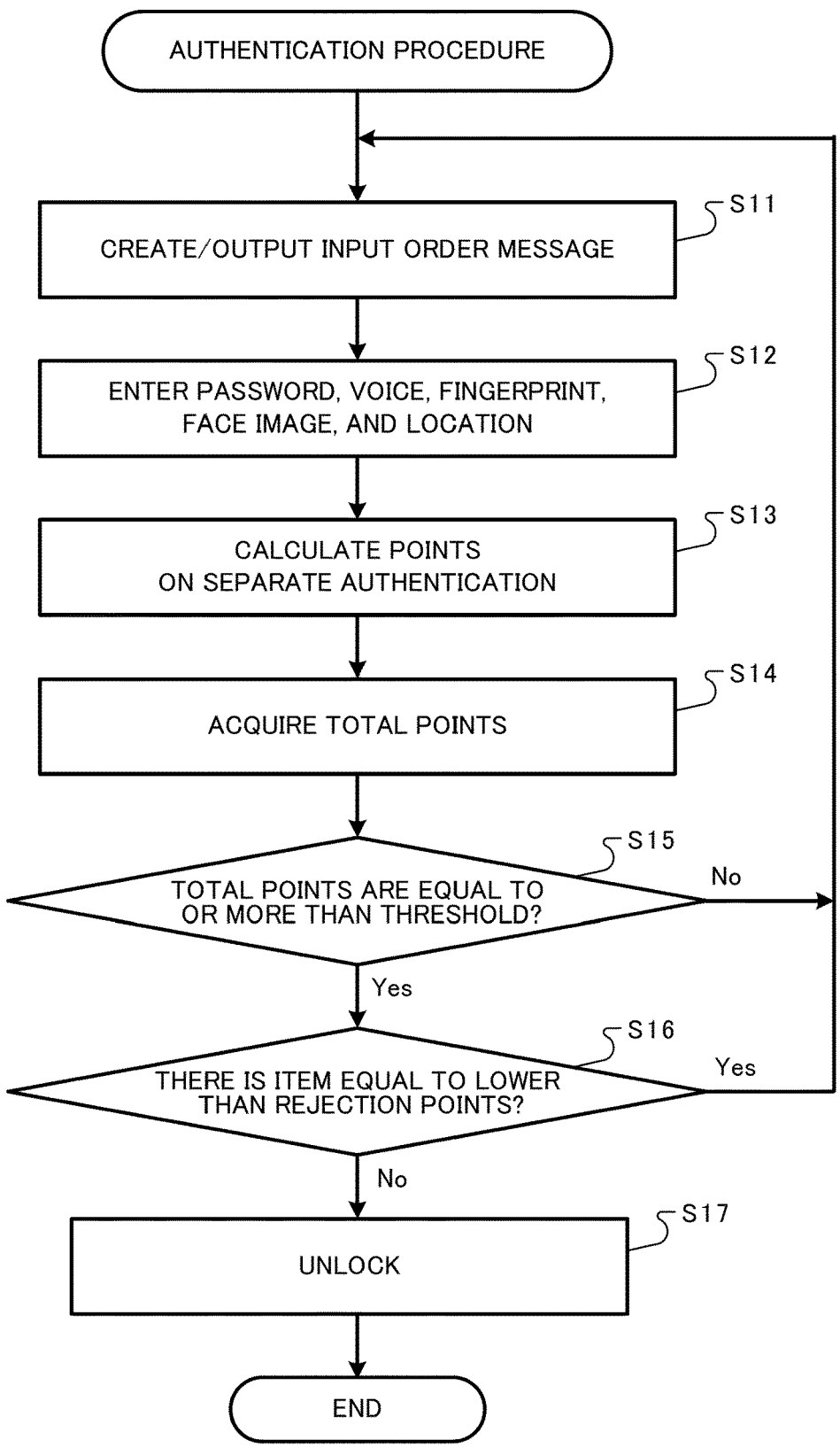
FIG. 5 is a flowchart of the authentication procedure of the terminal device shown in FIG. 1.

The authentication procedure executed by the controller 110 will be described next with reference to the flowchart of FIG. 5.

After completing the initializing process that is a process following power-on or after waking up from sleep, the terminal device 10 is put in a locked state in which no operation is allowed until the authentication is successfully done. In this locked state or as a specific file requiring authentication is accessed, the controller 110 starts the authentication procedure shown in FIG. 5 to determine whether the user is a legitimate user.

First, for performing the authentication procedure, the controller 110 selects a piece of personal information of the user with reference to authentication data and creates and displays on the display 132 a massage "Please enter password from keyboard and say '(extracted personal information)' into microphone" (Step S11). For example, if the extracted personal information is "the month and date of the date of birth," the controller 110 displays on the display 132 a message "Please enter password from keyboard and say 'the month and date of your date of birth' into microphone."

Moreover, the controller 110 displays a software keyboard for entering a password on the display 132. According to the display, the user operates the software keyboard to enter a password, and further utters the required personal information into the microphone 11.

As described above, a relatively simple password that is easy to enter using a software keyboard displayed on a relatively small screen of the terminal device 10 with no switching operation is set as the password. Therefore, the user can carry out input with little effort. Moreover, the microphone 11 faces the user and thus the user can easily carry out input without raising his voice. Moreover, at this point, the user naturally holds the terminal device 10 in the way shown in FIG. 3 (in the case of the right-handed) with the thumb in contact with the left fingerprint sensor 14 and the middle finger and ring finger in contact with the right fingerprint sensor 15. Moreover, the face is situated in front of the terminal device 10.

As the user operates the software keyboard to enter a predetermined password and further utters voice including the personal information, the controller 110 retrieves the entered password and retrieves the voice through the microphone 11 (Step S12). Moreover, meanwhile, the controller 110 retrieves information of the user's fingerprints from the left fingerprint sensor 14 and the right fingerprint sensor 15. Furthermore, the controller 110 activates the camera 16 to acquire several images of the user's face situated in front, and acquires information presenting the current location from the GPS device 17 (Step S12).

Then, the controller 110 performs the authentication procedure based on the entered information for each of the information types with reference to the authentication DB 111b to obtain points (Step S13). First, the controller 110 determines whether the entered password matches the registered password with reference to the authentication DB 111b to obtain points.

Then, the controller 110 recognizes the retrieved voice and determines whether the voice matches information registered as personal information inquired of the user in the Step S11 to obtain points. Moreover, the controller 110 analyzes the retrieved voice and determines the degree of match of the voiceprint pattern to the voiceprint pattern registered in the authentication DB 111b to obtain points.

Similarly, the controller 110 analyzes fingerprint data retrieved from the left fingerprint sensor 14 and obtains the degree of match to the thumb fingerprint registered in the authentication DB 111b to obtain points. Similarly, the controller 110 analyzes fingerprint data retrieved from the right fingerprint sensor 15 and obtains the degree of match to the middle finger and ring finger fingerprints registered in the authentication DB 111b to obtain points.

Furthermore, the controller 110 crops a face image from the retrieved image and determines the degree of match of the cropped face image to the user's face image registered in the authentication DB 111b to obtain points.

Moreover, the controller 110 determines whether the current location of the terminal device 10 matches the registered location to obtain points.

For example, if the entered password matches the registered password, 2.2 points are scored according to the authentication DB 111b shown in FIG. 4. Similarly, if the entered date of birth that is personal information is the 29th of February corresponding to the required personal information, 2 points are scored.

Moreover, if the degree of match (likelihood) of the voiceprint pattern of the entered voice to the voiceprint pattern registered in the authentication DB 111b is 70%, the successful authentication condition is satisfied and thus 1.3 point are scored. On other hand, if it is 50%, the successful authentication condition is not satisfied and thus 0 points are scored.

Similarly, if the degree of match between the fingerprint data detected by the left fingerprint sensor 14 and the fingerprint registered in the authentication DB 111b is 80%, the successful authentication condition is satisfied and thus 1 point is scored. On other hand, if the degree of match is 55%, the successful authentication condition is not satisfied and thus 0 points are scored.

Then, the controller 110 adds up the points on the information types to obtain total points (Step S14).

Then, the controller 110 determines whether the obtained total points are equal to or higher than a reference value (Step S15). If higher, the controller 110 determines whether there is an information type satisfying a rejection condition (Step S16). For example, if the password is wrong or the personal information is wrong, a rejection condition is satisfied.

If the total points are equal to or higher than a reference value and no rejection condition is satisfied (Step S15: Yes, Step S16: No), the terminal device 10 is unlocked (Step S17).

On the other hand, if the total points are lower than a reference value or a rejection condition is satisfied (Step S15: No or Step S16: Yes), the processing returns to the Step S11 for executing the authentication procedure again.

With the above configuration, each of the password authentication, the fingerprint authentication, the face authentication, and the like can be of relatively low accuracy. Therefore, parts/software simple in configuration and relatively low in accuracy can be used. On the other hand, the authentication is performed from multiple viewpoints and whether to unlock is determined based on the total evaluation, whereby the overall reliability is high.

After the authentication procedure is successfully done, the user is free to operate the terminal device 10 to create and transmit/receive email messages. Upon the user creating/editing and transmitting/receiving an email message, the controller 110 starts the procedure shown in FIG. 7 and first analyzes the email message (Step S21) to determine whether any appointment information (schedule information) is included in the email message from the address, the transmission source, and the body text. Then, if determined that it is included, the controller 110 extracts the included schedule information (Step S22) and then posts the information on the date/time of the calendar retained by schedule management software (Step S23). Hence, it is possible to perform the authentication procedure in a simple and highly reliable manner and then easily perform the schedule management.

The present disclosure is not confined to the above embodiment and various modifications and applications are available. For example, the information types used in authentication are not restricted to those described above. Moreover, only some of the information can be used.

Embodiment 2

The terminal device according to Embodiment 2 of the present disclosure will be described below with reference to the drawings. The terminal device 10 of this embodiment performs authentication by password input in the beginning, learns biological information of the user while the user is using the terminal 10, and switches to biometric authentication when the learning reaches a specific level.

The terminal device 10 according to this embodiment has the same basic configuration as the configuration shown in FIGS. 1 to 3.

However, the storage 111 saves an authentication DB 111b. The authentication DB 111b associates and stores an information type and registered information as shown in FIGS. 8A and 8B.

The information type presents the type of information used in authentication. The registered information is information preregistered in regard to each type.

In this embodiment, a password, fingerprint information, and a face image are used as the information type. The password is a character string. As a password, a temporal password is preset in the initial state as shown in FIG. 8A and rewritten to a favorite one and used by the user from then on as shown in FIG. 8B.

The fingerprint information is unregistered in the initial state as shown in FIG. 8A. The terminal device 10 acquires fingerprint information at times of use or the like and gradually accumulates fingerprint information as shown in FIG. 8B. Here, during the authentication procedure, a right-handed user usually holds the terminal device 10 as shown in FIG. 3. Therefore, information of the thumb is registered as left fingerprint information and information of the middle finger and ring finger is registered as right fingerprint information. For the left-handed, the information types are reversed.

The face image is unregistered in the initial state as shown in FIG. 8A. The terminal device 10 acquires a face image by means of the camera 16 at times of use or the like and gradually accumulates face images as shown in FIG. 8B. Moreover, the authentication DB 111b saves a biometric authentication flag for switching between execution of the authentication procedure by a password and execution of the authentication procedure by biometric authentication. The biometric authentication flag is set to "0" (reset) as the default and then switched to "1" (set) when biological information is accumulated and a criterion for practical authentication by biological information is satisfied.

The authentication procedure executed by the controller 110 will be described next with reference to the flowchart of FIG. 9.

After completing the initializing process that is a process following power-on or after waking up from sleep, the terminal device 10 is put in a locked state in which no operation is allowed until the authentication is successfully done. In this locked state or as a specific file requiring authentication is accessed, the controller 110 starts the authentication procedure shown in FIG. 9 to determine whether the user is a legitimate user.

First, for performing the authentication procedure, the controller 110 determines whether the biometric authentication flag is "1" (set) or "0" (reset) (Step S31). Immediately after starting to use the terminal device 10, the biometric authentication flag is "0" and thus the process flow proceeds to Step S32 in which the authentication procedure by a password is performed to control whether to unlock/keep locked the device or to control whether to allow access to a file (Step S32).

For the authentication procedure by a password, the controller 110 displays a software keyboard for entering a password on the display 132. At this point, the user naturally holds the terminal device 10 in the way shown in FIG. 3 (in the case of the right-handed) with the thumb in contact with the left fingerprint sensor 14 and the middle finger and ring finger in contact with the right fingerprint sensor 15. Moreover, the face is situated in front of the terminal device 10.

The user operates the software keyboard to enter a password. Meanwhile, the controller 110 retrieves information of the user's fingerprints from the left fingerprint sensor 14 and the right fingerprint sensor 15. Furthermore, the controller 110 activates the camera 16 to acquire an image of the user's face situated in front.

As the password authentication is successful in the Step S32, the controller 110 registers the acquired fingerprint information and face image in the authentication DB 111*b* (Step S33). Here, instead of acquiring a large amount of fingerprint information and/or face images at a time, it may be possible to suppress the amount of information to acquire at a time or to acquire information at times and not acquire information at other times for gradually accumulating information with different timings.

Then, the controller 110 performs a dummy authentication procedure based on biological information (fingerprints and a face image) with reference to the authentication DB 111*b*, and evaluates successful/unsuccessful authentication (Step S34). However, this authentication procedure by biological information has no direct influence on whether to unlock/keep locked or whether to allow access to a file.

Then, the controller 110 determines whether the result of the authentication procedure by biological information is sufficient for practical use (Steps S35 and S36). If determined to be sufficient for practical use, the controller 110 rewrites the biometric authentication flag to "1" (Step S37) and ends the ongoing authentication procedure. For example, if the amount of biological information accumulated in the authentication DB 111*b* is equal to or greater than a reference value and/or if the result of authentication by a password and the authentication by biological information (fingerprints and a face image) successively match a prescribed number of times (for example, 99 times), it is determined to be sufficient for practical use and the biometric authentication flag is rewritten to "1."

On the other hand, if determined in the Step S31 that the biometric authentication flag is "1," the authentication procedure by biological information is performed to unlock/keep locked (Step S38).

With the above configuration, authentication by a password is performed for a while after starting to use the terminal device 10. Meanwhile, biological information such as fingerprint information and face images is accumulated in the authentication DB 111*b*.

Upon each authentication, the terminal device 10 evaluates the result of the authentication procedure by the biological information accumulated in the authentication DB 111*b* and when it is determined to be sufficient for practical use, switches to biometric authentication from then on. Therefore, information necessary for biometric authentication is accumulated and switching to biometric authentication occurs without the user himself being conscious of.

The present disclosure is not confined to the above embodiment and various modifications and applications are available. For example, biological information used in authentication is not restricted to those described above. For example, biological information such as the iris pattern that can be acquired by the camera 16 and the vein pattern that can be acquired by an infrared camera may be used. Moreover, in Embodiment 2, location information acquired by the GPS device 17 can be used as authentication information.

For example, in Embodiment 2, the controller 110 acquires location information by means of the GPS device 17 while the user is using the terminal device 10 and gives a lot of points if the terminal device 10 is used at N locations of high frequency of use.

Note that it is desirable that authentication information including biological information is information that can automatically be acquired by sensors possessed by the terminal device 10 while the user is using the terminal device 10.

It may be possible to acquire biological information each time the Step S32 or S38 is executed and update old biological information accumulated in the authentication DB 111*b*.

It is also possible to combine the method of Embodiment 1 and the method of Embodiment 2. For example, in the beginning, authentication is performed based on the total points using a password, a voiceprint, and the like. After sufficient biological information is accumulated, it may be possible to eliminate the authentication by a password and switch to authentication based on the total points using only the biological information.

Moreover, the arrangement of devices/parts can be changed on an arbitrary basis. The terminal device 10 executing the above-described procedures may be configured by saving and distributing a computer program for making a computer function as the terminal device 10 on a non-transitory computer-readable recording medium (CD-ROM and the like) and installing the program on a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure is based on Japanese Patent Application No. 2015-093730 and Japanese Patent Application No. 2015-093731, filed on Apr. 30, 2015, of which the specifications, scopes of claims, and the drawings are entirely incorporated herein by reference.

REFERENCE SIGNS LIST

10 Terminal device
11 Microphone
12 Speaker
13 Touch panel
14 Left fingerprint sensor
15 Right fingerprint sensor
16 Camera
17 GPS device

The invention claimed is:

1. A terminal device, comprising:
an authentication information acquirer acquiring multiple different pieces of authentication information;
a separate authentication procedure executer executing a separate authentication procedure based on each piece of authentication information acquired by the authentication information acquirer;
a total authentication determiner determining whether authentication is successful or failed from a combination of results of multiple separate authentication procedures performed by the separate authentication procedure executer; and unlocking means for unlocking a device to allow operations when the total authentication determiner determines that the authentication is successful, wherein the separate authentication procedure executer comprises
a first authentication procedure executer executing an authentication procedure by a piece of authentication information acquired by the authentication information acquirer;
an authentication information accumulator accumulating a piece of another authentication information acquired by the authentication information acquirer; and
a second authentication procedure executer executing an authentication procedure based on the piece of other authentication information accumulated in the authentication information accumulator, the total authentication determiner
determines whether authentication is successful or failed by the authentication executed by the first authentication procedure executer, and further determines, in a background, whether authentication is successful or failed by the authentication executed by the second authentication procedure executer, and
comprises a switching controller evaluating authentication results obtained in the authentication procedure by the second authentication procedure executor and switching from the authentication by the first authentication procedure executer to the authentication by the second authentication procedure executer when the authentication by the second authentication procedure executer is determined to satisfy a predetermined criterion, and the piece of authentication information is a password, and the piece of other authentication information is a piece of biological information.

2. The terminal device according to claim 1, wherein
the authentication information acquirer acquires the multiple different pieces of authentication information while a user is using the terminal device, and
the piece of other authentication information further includes location information of the terminal device.

3. The terminal device according to claim 1, wherein
the authentication information acquirer acquires multiple pieces of other authentication information, and
the second authentication procedure executer executes an authentication procedure based on the multiple pieces of other authentication information acquired by the authentication information acquirer.

4. The terminal device according to claim 1, wherein,
the switching controller switches from the authentication by the first authentication procedure executor to the authentication by the second authentication procedure executor when a predetermined or more amount of pieces of other authentication information is accumulated in the authentication information accumulator and the total authentication determiner determines that the authentication procedure executed by the second authentication procedure executor is successively successful a reference or higher number of times.

5. The terminal device according to claim 1, wherein,
for each of the multiple pieces of authentication information acquired by the authentication information acquirer, the separate authentication procedure executor executes a separate authentication procedure based on each piece of authentication information on the basis of a reference level at which the authentication cannot be determined to be successful in authentication by a single piece of authentication information, and
the total authentication determiner determines whether the authentication is successful or failed from a combination of results of multiple separate authentication procedures performed by the separate authentication procedure executor.

6. The terminal device according to claim 1, wherein the authentication information includes:
information based on which the separate authentication is determined to be successful only when the information completely matches reregistered information; and
information based on which the separate authentication is determined to be successful when a degree of match between the information and reregistered information is equal to or higher than a reference level.

7. The terminal device according to claim 1, wherein
points scored when the authentication is determined to be successful in the separate authentication procedure is set for each piece of authentication information, and
the total authentication determiner adds up the points scored in the separate authentication procedures and determines that the authentication is successful when the total points are equal to or higher than a reference value.

8. The terminal device according to claim 7, wherein
for some of the authentication information, a criterion for regarding the authentication unsuccessful regardless of the total points when the criterion is satisfied is set.

9. A computer program for causing a computer to function as the terminal device according to claim 1.

* * * * *